(12) United States Patent
Banasik

(10) Patent No.: US 8,663,724 B1
(45) Date of Patent: Mar. 4, 2014

(54) AUTOMATED BEVERAGE BREWING METHOD

(75) Inventor: Gregory Banasik, Arlington Heights, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 271 days.

(21) Appl. No.: 13/037,081

(22) Filed: Feb. 28, 2011

Related U.S. Application Data

(60) Provisional application No. 61/310,119, filed on Mar. 3, 2010.

(51) Int. Cl.
*A47J 31/32* (2006.01)
(52) U.S. Cl.
USPC .......................................... 426/433; 426/431
(58) Field of Classification Search
USPC ................................................ 426/431, 433
See application file for complete search history.

(56) References Cited

U.S. PATENT DOCUMENTS

| | | | | |
|---|---|---|---|---|
| 3,354,811 | A * | 11/1967 | King | 99/282 |
| 6,095,031 | A * | 8/2000 | Warne | 99/282 |
| 7,040,218 | B1 | 5/2006 | Biolchini, Jr. | 99/297 |
| 7,621,212 | B2 | 11/2009 | Carboninni | 99/302 |
| 2006/0037481 | A1* | 2/2006 | Bicht | 99/279 |
| 2007/0227363 | A1* | 10/2007 | Verna | 99/279 |
| 2007/0245902 | A1* | 10/2007 | Frigeri et al. | 99/279 |
| 2009/0136639 | A1* | 5/2009 | Doglioni Majer | 426/431 |
| 2010/0173054 | A1* | 7/2010 | Camera | 426/433 |

FOREIGN PATENT DOCUMENTS

EP 73739 * 3/1983

* cited by examiner

*Primary Examiner* — Anthony Weier
(74) *Attorney, Agent, or Firm* — James W. Potthast; Potthast & Associates

(57) ABSTRACT

An electrical, automatic hot beverage brewer (10) and method of brewing in which a removable brew chamber (20) has a drain hole (25) in the bottom fitted with a normally closed, pressure responsive brew chamber drain valve assembly (24) maintained in a normally closed position except when pressure against the drain valve (24) exceeds a preselected minimum pressure limit that is greater than the fluidic pressure applied by virtue of head pressure of a full load of hot water and a piston (74) is moved within the brew chamber to control the opening and closing of the drain valve (24) When the piston (74) moves downwardly toward the drain hole the air pressure of a pocket of air (90) above the beverage (92) in the brew chamber (20) is increased to open at the end of a seeping period when it is desired to rapidly expel freshly brewed beverage out the brew drain valve at a relatively rapid rate depending upon the total of the hydraulic pressure and the added pressure from the air pressure source to avoid the need to wait for the end of a drip period. The drain valve (24) automatically closes after the piston (74) is removed from the brew chamber (20) to enable removal of the brew chamber (20) from a brewer housing (12) without risks of hot beverage leaking out of the brew chamber (20).

18 Claims, 3 Drawing Sheets

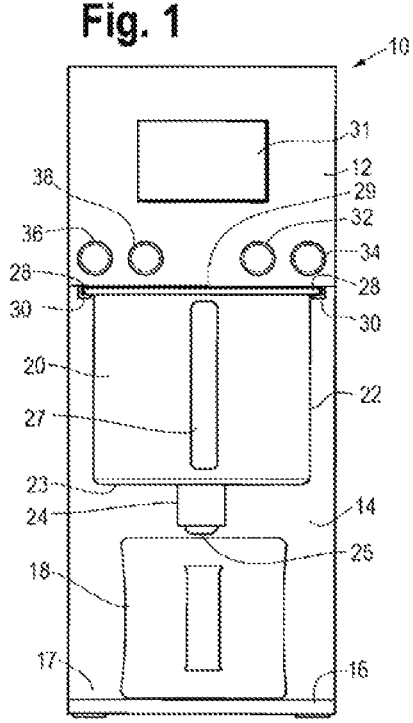
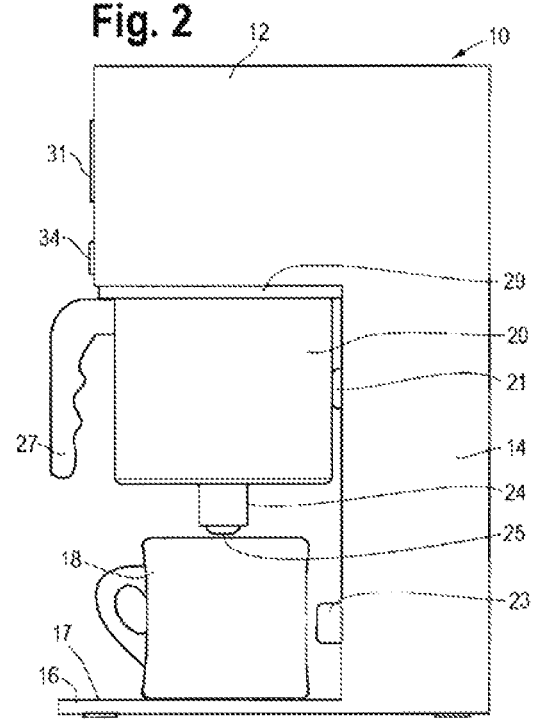
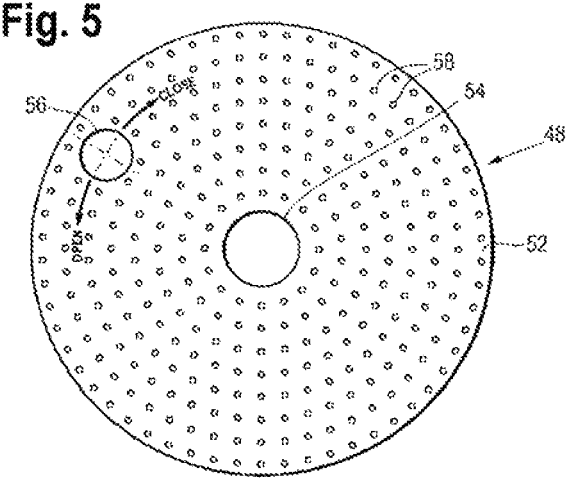

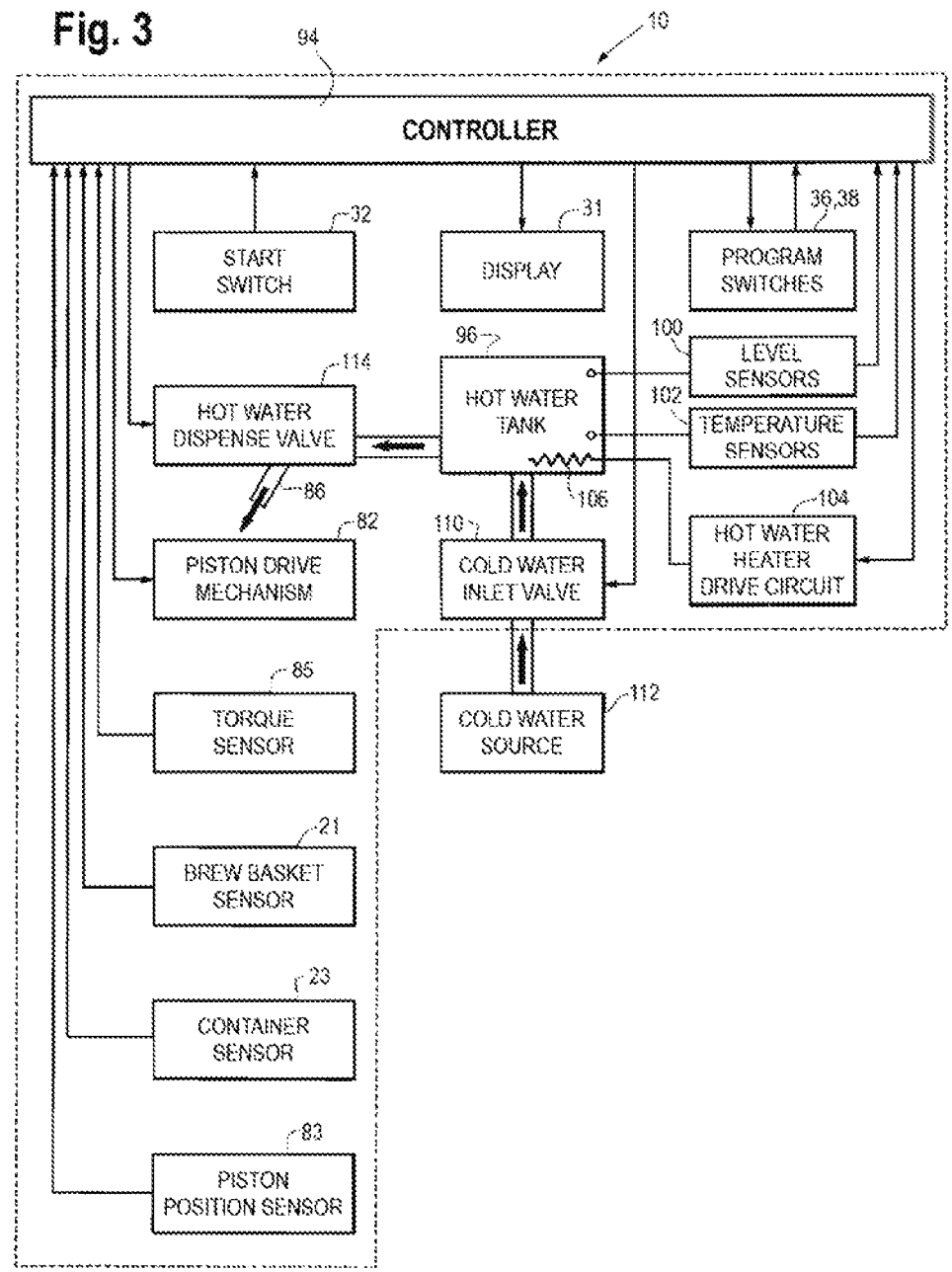

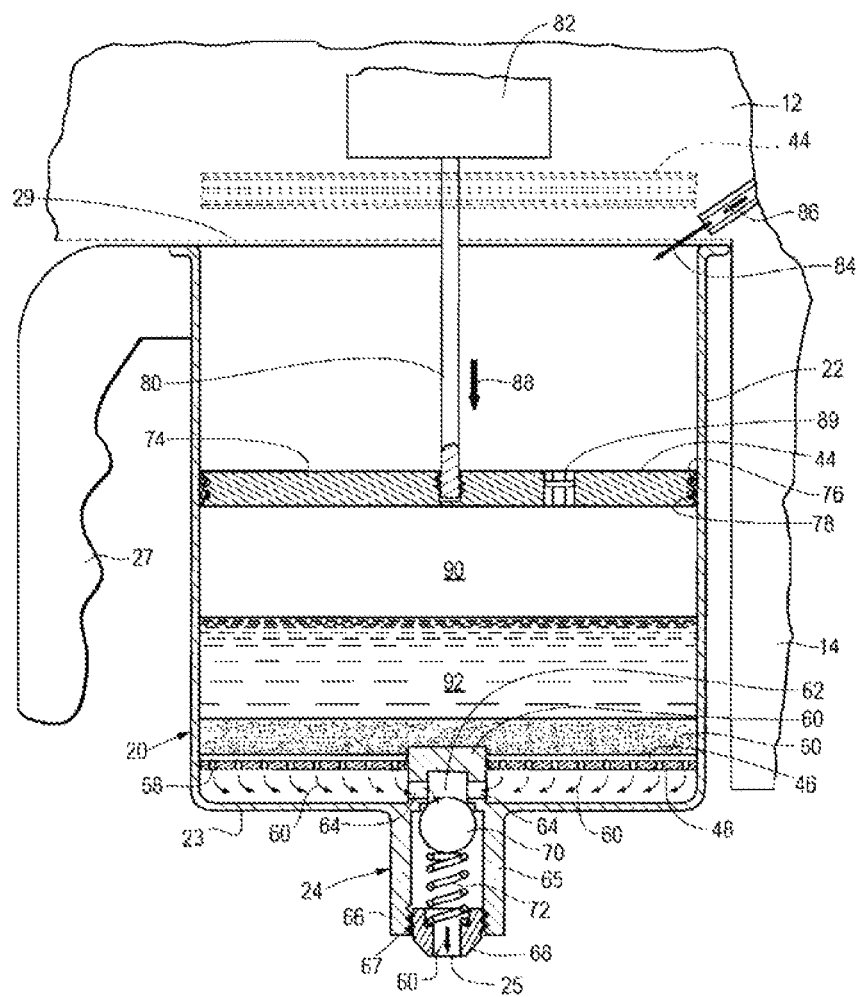

AUTOMATED BEVERAGE BREWING METHOD

CROSS-REFERENCE TO RELATED APPLICATION

This application claims the benefit under 35 USC 119(e) of U.S. provisional patent application 61/310,119, filed Mar. 3, 2010, which is hereby incorporated by reference.

BACKGROUND OF THE INVENTION

1. Field of the Invention

This invention generally relates to hot beverage brewers, such a coffee or tea brewers, and more particularly, to an electrical hot beverage brewer 2. Discussion of the Prior Art Electrical coffee or tea brewers or the like of the type that hold the beverage ingredient in a brew chamber for a preselected seeping time period and then quickly discharge the freshly brewed beverage out of the brew chamber are known.

Drip-type beverage brewers operate by filling a brew chamber with hot water that immediately begins to percolate through a layer of beverage ingredient and out of an open drain hole as soon as the first water is added until all the beverage has passed through the ingredient. The rate at which the beverage passes from the drain hole is dependent upon the rate at which the hot water is dispensed into the brew chamber and the level of beverage in the brew chamber. The rate is higher at the beginning of the period and slows to mere drips once the brew chamber is near empty. There is no seeping period during which all the hot water added remains in the brew chamber to form a uniformly extracted beverage before any of the beverage is released from the brew chamber. Accordingly, the brew chamber, or brew basket, need not have capacity to hold all the entire batch of beverage made during a single brew cycle. Disadvantageously, the extraction is uneven and difficult to control, with most of the extraction occurring during the beginning of the brew cycle Another disadvantage is that commencement of a new brew cycle is delayed while waiting for the end of the drip period. Because the drain hole at the bottom of the brew basket is always open, it is necessary to wait until the last of the hot water has passed through the beverage ingredient within the brew chamber and drained out of the brew chamber before removing the brew chamber from the brewer for reloading. It is necessary to wait because failure to do so results in dangerous and unsanitary spillage of hot beverage on floors, counter tops and onto the operator's skin or clothing.

Espresso machines produce small amounts of beverage with very concentrated flavor in a single phase during which hot water under steam pressure is rapidly forced though a brew chamber containing the ground espresso coffee beans. However, suffer from an open drain brew chamber, and another disadvantage of such espresso machines is that they are generally suitable for making only a single small cup of espresso per brew cycle. Accordingly, it is known to increase the amount of beverage by mixing the finished espresso beverage with hot water to form what is known as an "Americano".

In a French press-type brewer, larger quantities of beverage are brewed during a single phase in which a plunger directly engages and presses the layer of beverage ingredient in the brew chamber against the bottom filter support to rapidly press the beverage through the porous ingredient layer and out of the brew chamber after a preselected seeping period.

In press-type brewers, the drip period my be accelerated by means of direct pressing by the plunger, but residual liquid in the brew chamber can still drip out of the brew chamber after it is disconnected from the brewer. Another problem with known press-type brewers is caused by the plunger coming into direct, physical, intimate contact with the beverage and the wet beverage ingredient. In the event that different types of coffee or different flavored coffee are being successively brewed, then there can be flavor contamination from one batch to the next due to residual beverage and wet, spent beverage ingredient adhered to the plunger and associated parts immersed into the beverage and pressed against the layer of beverage ingredient. In order to avoid such contamination, it is necessary to wash clean the plunger between each batch of beverage being brewed. Disadvantageously, such cleaning of the plunger increases the length of time needed to properly prepare and load the brewer for the next brewing cycle.

This additional preparation time reduces the speed at which successive brew cycles may be performed and can thereby cause service delays in a commercial brewing operation, such as in a coffee house, tea room or catering environment. In such commercial operations it is often very important that each batch of freshly brewed beverage may be made as quickly as possible. In addition, the elimination of the step of washing eliminates the need and costs of water and detergent for the washing operation.

Another problem with the operation of known press-type brewers is that it is not possible for the brewer to make an amount of beverage during a single brew cycle that is greater than the maximum volume of beverage and hot water that can be held by the brew chamber. If a greater volume is required, then additional brew cycles are needed to make the greater volume. However, increasing the volume capacity of the brew chamber requires larger brewer parts and tends to make the brew chamber unwieldy to load, unload and otherwise handle. Again, in a commercial beverage operation, such delays and the resultant reduced volume through-put should be avoided as much as possible to obtain maximum efficiency. Also, control of the ratio of the volume of hot water to quantity of dry beverage ingredient and the length of brewing time is limited due to the maximum volume of the brew chamber.

SUMMARY OF THE INVENTION

It is therefore an object of the present invention to provide a method of brewing with an automatic beverage brewer in which the problems of known brewers are overcome or ameliorated. The better qualities of espresso extraction, the speed of the French press and the volume capacity of drip coffee makers are obtained while avoiding the shortcoming of each of them.

Thus, in accordance with the brewing method of the present invention, increased pressure within the brew chamber is used to simultaneously to perform the dual functions of opening the spring loaded brew chamber outlet valve and selectively accelerating the flow of freshly brewed beverage through the outlet valve. Because the brew chamber drain valve opens automatically in response to the same pressure that causes the beverage to drain at a preselected rate, the need for a separate controller for the brew chamber drain valve is entirely eliminated. Also, the environment of a hot beverage brewer is hot, humid, wet and sometime caustic, but advantageously the operation of the brew chamber drain valve does not require the brewer to maintain a costly and relatively fragile, separate, electronic or electromechanical valve controller.

Preferably, the piston is provided with a relatively air tight seal members around its circumference in contact with the cylindrical wall of the brew chamber. Preferably, the cylindrical wall of the piston has a pair of semi-circular grooves within which are receivably mounted a pair of resilient O-rings that make an air-tight seal with the interior sides of the brew chamber cylindrical wall, Further, because of the air-tight seal, it is not necessary to press the piston into the beverage to hasten the discharge of beverage. Instead, a cushion of air is created in the brew chamber between the bottom of the piston and outlet valve. The piston moves downwardly toward the beverage in the bottom of the brew chamber but before it reaches the beverage, the pressure on the pressure release brew chamber outlet valve exceeds the preselected limit at which the valve switches from a closed state to an open state. When the valve opens, the beverage begins to drain and the level of the beverage within the brew chamber begins to drop further away from the lowering piston. The pressure tends to drop when the brew chamber outlet drain is opened, but this drop in pressure is selectively compensated by the piston continuing to lower so that the pressure remains above the preselected level and the outlet valve remains open until the entire beverage has been discharged.

As noted, after the entire amount of beverage has been discharged from the brew chamber the outlet valve is automatically closed. Advantageously, this automatic closing of the valve enables the brew chamber to be slidably removed from brewing location to be emptied and recharged with a new filter paper and load of dry beverage ingredient without concern about residual beverage continuing to drip out of the brew chamber before the wet grounds have been removed.

In accordance with one aspect of the brewing method of the present invention, a single brew cycle includes two or more successive pressing operations with a single quantity of dry beverage ingredient, such as dry tea leaves or ground coffee beans. In accordance with this method, a selected quantity of beverage is produced by first (1) loading the brewer with a brew chamber with a controllable drain valve and containing the preselected single quantity of dry beverage ingredient, (2) injecting a first preselected quantity of hot water into the brew chamber and onto the dry beverage ingredient to mix with the beverage ingredient for a first preselected seeping period, (3) automatically opening the brew chamber controllable drain valve at the end of the first preselected seeping period, (4) automatically controlling the air pressure in the brew chamber to control the rate of draining of beverage from the controllable drain valve, (5) draining a preselected amount of beverage from the brew chamber, (6) automatically closing the brew chamber drain valve at the end of the first preselected seeping period, (7) injecting a second preselected quantity of hot water into the brew chamber to mix with the beverage ingredient for a second preselected seeping period, (8) automatically opening the brew chamber controllable drain valve at the end of the second preselected seeping period, (9) automatically controlling the air pressure in the brew chamber at the end of the preselected seeping period to control the rate of draining of beverage from the controllable drain valve, and (10) automatically draining beverage from the brew chamber at the end of the second seeping period.

Preferably, the beverage drained during the second seeping period is mixed with the beverage drained during first seeping period to produce a composite beverage.

Preferably, the step of controlling the pressure is performed by controlling the movement of the air-tight piston in a cylindrical portion of the brew chamber above a dry ingredient support located above the drain hole and drain valve.

Preferably, the brew chamber drain valve is a pressure sensitive valve that is controlled by means of varying the air pressure in the brew chamber above the beverage within the brew chamber.

Preferably, substantially all the beverage is drained from the brew chamber at the end of the first seeping period before the second preselected quantity of water is injected into the open top of the brew chamber.

In accordance with this method, the piston is elevated above the open top of the brew chamber after all the beverage has been drained to enable sliding removal of the brew chamber from the brewer, installation of a fresh brew chamber and the injection of water into the open top. On the other hand, when the piston is within the brew chamber, inadvertent and dangerous removal of the brew chamber is prevented.

The objective of the invention is also partly obtained by providing a method of brewing beverage in an automatic, electric brewer by performing the steps of (a) seeping only in a brew chamber a first preselected quantity of hot water with a preselected quantity of beverage ingredient for a preselected first seeping time period, (b) draining the beverage from the brew chamber at the end of the preselected first seeping time period into a beverage container, (c) maintaining the beverage ingredient remaining in the brew chamber after the end of the, (d) first seeping period, (e) injecting a second preselected quantity of hot water into the brew chamber to mix with the beverage ingredient remaining in the brew chamber after the end of the first seeping period, (f) seeping in the brew chamber the second quantity of hot water with beverage ingredient remaining for a second preselected seeping time period; and (g) draining the beverage from the brew chamber into the beverage container to mix with the beverage drained into the container at the end of the first seeping period.

Achievement of the objective of the invention is also obtained in part by providing a method of brewing beverage in an automatic, electric brewer, by performance of the steps of (a) seeping a preselected quantity of beverage ingredient in a preselected quantity of hot water in a brew chamber for a preselected seeping period to form a beverage, (b) opening a brew chamber drain valve at the end of the preselected seeping period to allow the beverage to drain from the brew chamber, (c) pressing an air-tight piston downwardly into the brew chamber above the beverage to increase the air pressure above the beverage to control the rate of draining of the beverage from the brew chamber.

This brewing method also preferably includes the step of pressing downwardly only on a cushion of air trapped between the piston and the top of the beverage when the piston is inserted into the top of the brew chamber and does not contact the beverage. Also, preferably the brew chamber drain valve is a pressure sensitive valve and the step of opening the brew chamber drain valve includes the step of pressing the air-tight piston downwardly to increase a total of hydraulic pressure and air pressure on the valve sufficiently to open the valve. Preferably, all of the steps are performed automatically in an electrical brewer.

The object of the invention is also acquired partly by providing a method of brewing beverage by performing the steps of (a) seeping a preselected quantity of beverage ingredient in a preselected quantity of hot water in a brew chamber for a preselected seeping period to form a beverage, (b) increasing the pressure in the brew chamber above a preselected minimum opening pressure, (c) automatically, mechanically opening a brew chamber pressure sensitive drain valve with force from both the hydraulic pressure of the hot water within the brew chamber and the air pressure of the pocket of air when a total of the hydraulic pressure and the air pressure in the brew chamber exceeds the preselected minimum opening pressure to open the pressure sensitive drain valve to drain the beverage from the brew chamber.

Preferably, the pressure sensitive valve is a ball valve with a movable ball that is automatically moved to a closed position by a bias spring when the pressure on the valve is less than the preselected minimum opening pressure. After the valve is closed at the end of the seeping period, the brew chamber may be removed without residual beverage in the brew chamber leaking or dripping out of the brew chamber. Preferably, the pressure is controlled by movement of a piston having an air-tight seal with the interior surface of the brew chamber above the beverage. When the piston is moved downwardly, it presses against a cushion of trapped air that, in turn, presses downwardly on the surface of the beverage at the bottom of the brew chamber. When the piston is moved upwardly the pressure is decreased and a release valve in the surface of the piston is opened to facilitate easy upward movement of the piston. After the end of the seeping period, the piston is elevated entirely out of the open top of the brew chamber to enable removal of the brew chamber from the brewer.

BRIEF DESCRIPTION OF THE DRAWINGS

The foregoing objects, features and advantages will be described in detail and others will be made apparent from the following detailed description of the preferred embodiment of the hot beverage brewer of the present invention given with reference to the several figures of the drawing, in which:

FIG. 1 is a front elevation view of a preferred embodiment of the hot water beverage brewer of the present invention in a form for making a single serving of fresh beverage to be automatically drained into a single serving mug, or cup;

FIG. 2 is a side elevation view of the preferred embodiment of the hot beverage brewer of the present invention of FIG. 1;

FIG. 3 is a functional block diagram of the hot beverage brewer of FIGS. 1 and 2;

FIG. 4 is a schematic, sectional side view of the brew chamber and piston assembly employed in the hot beverage brewer of FIGS. 1-3; and FIG. 5 is a plan view of the filter support plate shown in sectional side view in FIG. 4.

DETAILED DESCRIPTION

Referring to FIGS. 1 and 2, a preferred embodiment of the hot beverage brewer 10 of the present invention is seen to include an upper housing section 12 supported in cantilever fashion by an aft housing section 14. The aft housing section 14, in turn, is supported by a forwardly extending foot member 16 that extends beneath a forward section of the upper housing section 12.

The forwardly extending foot member 16 may include a removable drip tray (not shown), but due to the drip prevention aspects of the invention, such a drip tray may not be needed. In any event, with or without a drip tray, a support surface 17 provides underlying support of a beverage container 18.

The brewer 10 is scalable upwards from one having capacity to make only a single serving of beverage for each brew cycle to one that is capable of making four liters of beverage or more per brew cycle. In the case of the brewer 10 being configured to make only a single serving of beverage per brew cycle, the container 18 is a single serving sized coffee or tea cup or mug. In the case of the brewer 10 being configured to make only one liter of beverage per brew cycle, the container 18 may constitute an open topped, glass, serving carafe or the like. In the case of the brewer being configured to make larger quantities, such as four liters, the container 18 may comprise an insulated beverage dispenser specially adapted to directly receive beverage from the brewer.

If the brewer 10 is configured to brew only a single serving amount or a larger amount not larger amount up to approximately one liter, then the operation includes only a single phase of operation, or single press, as explained below. On the other hand, if amounts of beverage per brew cycle are larger than one liter then preferably the brewing operation is performed in two or more phases, or presses.

The embodiment of the brewer 10 of FIGS. 1-2 is shown with a container 18 that is a coffee or tea mug and the brewer 10 is thus configured to make only a single serving per brew cycle. Other than size of the parts of the brewer 10 and the container 18, the functioning parts of the brewer 10 described below generally remain the same regardless of the quantities of beverage for which the brewer 10 has been configured to make. Also, the housings sections 12 and 14 may be made substantially larger to accommodate a carafe with several servings or a much larger insulated beverage dispenser capable of receiving and storing more than a several servings, such as two to four liters. In such case, the brew chamber is proportionately larger.

In the case of an insulated dispenser, the beverage is directly drained into a mating insulated dispenser that fits snugly beneath the drain hole and a single batch may be two liters, four liters or larger. As noted, when using such a large dispenser and making beverage batches of more than two liters, the two cycle method of brewing of the present invention noted above may be employed while smaller amounts may be accommodated by the single cycle approach. In any event, when brewing quantities of beverage greater than the capacity of the brew chamber, whatever size, the brewing may be performed in successive cycles of draining some beverage and refilling the brew chamber with hot water to make more beverage from the same beverage ingredient.

Likewise, while the preferred embodiment will be described with reference to brewing coffee, it should be appreciated that the brewer 10 could also be used to brew whole tea leaves, powdered tea, cocoa, powdered drink ingredient, etc. An important feature of the invention, particularly when making tea, is that during the first phase, the ingredient layer tea leaves is not so tightly compressed to preclude aeration of the tea leaves. Tea flavor is believed improved when air is present on the tea leaves while flooding the leaves without aeration results in a bitter taste.

In the single cup version shown in FIGS. 1 and 2, the open top of the cup 18, carafe or insulated dispenser is located directly beneath a brew chamber assembly 20. The brew chamber assembly 20 has a cylindrical brew chamber body 22 with a handle 27, open top 28 and a closed bottom 23 except for a drain hole 25 contained at the bottom of a drain hole valve assembly 24. The brew chamber assembly 26 has a pair of outwardly extending mounting collars 28 on opposite sides of the top 30 of the brew chamber assembly 20. The mounting collars 28 are slidably received within a pair of mating L-shaped channels 30 on the opposite sides of the underside of the forward section of the upper housing section 12. As describe below in greater detail with reference to FIG. 5, the brew chamber assembly 20 also includes a perforated paper filter support plate 48 releasably secured adjacent to but slightly above the bottom of the brew chamber body 23 to facilitate draining.

Mounted to the front of the upper housing section 12 is an electronic display screen 31 for interfacing with the operating system of the brewer 10 contained within the upper housing section 10, a start brew contact switch 32 for commencing a brew cycle, an emergency stop switch 34 for terminating the dispensing of hot water by the brewer 10, and one or more other switches 36 and 38 for inputting parameters to the operating system. A cup or other container detector 40 senses when a cup or other container is in proper position beneath the brew chamber ready to receive freshly brewed beverage, and a brew chamber detector 42 senses when a brew chamber 20 is in a fully loaded position as shown. The brewer 10 is powered by 115-VAC power and has a power cord (not shown) connectable to a standard AC outlet. A power switch to turn off power to a hot water heating element may also be provided.

Referring now to FIG. 4, during use of the brewer 10, the brew chamber 20 is slidably removed from the upper housing section 12 using the handle 27 to expose the open top 29. During such time, a piston 44, which is deployed into the interior of the brew chamber 20 during a brew cycle, as shown in a solid-line depiction of the piston assembly 44, is moved to an elevated, standby position above the open top 29, as shown in a broken-line depiction of the piston 44, to enable removal of the brew chamber 20. After it is removed, the brew chamber 20 is turned upside down over a sink or other disposal location to dispose of spent, wet coffee grounds, or other spent ingredients, and the wet filter paper 46 that remain from the last brew cycle The brew chamber 20 may then be rinsed of any residual coffee grounds or coffee, and a fresh dry piece of circular piece of filter paper 46 is placed on a filter support plate 48 adjacent the bottom 23. Then a layer of dry beverage ingredient 50, such a freshly ground coffee beans, is placed on top of the filter paper 46. The brew chamber 20 is then ready to be returned to the housing to be used for a new brew cycle.

In a fast moving coffee house, where individual cups are successively made with the same brewer 10 at a rapid pace, multiple brew chambers 20 may be employed so that some may be cleaned and recharged with fresh ground coffee and a fresh piece of filter paper 46 while others are being used and still others are being cleaned. If a semi-permanent gold mesh filter or the like is employed in lieu of the paper filter, then the filter may not necessarily be removed for cleaning each time the brew chamber is used but may be semi-permanently attached to the filter support plate 48.

Referring also to FIG. 5, the filter support plate 48 has a round, flat body 52 made of stainless steel or the like, with a central mounting hole 54, a peripheral finger hole 56 for gripping the body 52 to turn it during mounting and a plurality of perforations 58 designed to hot pass beverage 58, FIG. 4, to the bottom 23 piece of stainless steel or the like. The central mounting hole 54 has an internal helical thread or other rotatable fastener that is screwed onto an upstanding cylindrical mounting post 60 which extends above the filter support plate 48. The filter paper 46 has a central mounting hole within which the portion of the mounting post 60 above the filter support plate 48 is slidably and snugly received.

The mounting post 60 extends upwardly from the center of the bottom 23 and spans a valve inlet 62 of the valve assembly 24. Located beneath the threaded uppermost part of the mounting post 60, slots 64 passing through to the valve inlet 62 enable the passage of beverage 60 to the inlet 62.

Beneath the inlet 62, the valve assembly 24 has a generally cylindrical tubular body 65 with an internally threaded open outlet end 67 within which is threadably received a spring retaining, externally threaded, valve outlet member 68 which contains the valve outlet 25. Contained within the cylindrical body 65 is a valve inlet closing ball 70 that is normally pressed against the inlet 62 to block, and thereby close, the inlet 62 by a coil spring 72 except when the force of the spring 72 is overcome by downward pressure from the beverage 60 including any increased air pressure above the beverage 60. During assembly, the valve outlet member 68 is threadably removed from the larger outlet end 67 to allow insertion of the ball 70 and the spring 72 into the cylindrical tubular body 65 of the valve assembly 24. The valve outlet member 68 is then threadably reattached to the position shown in FIG. 4 to force the spring 72 into compression between the top of the valve outlet member and the ball 70. One or more O-ring or other seals may be provided at the valve inlet 62 to enhance a water tight seal when the ball is pressed against the seals. The valve outlet member may be screwed into the open end 67 by greater or lesser amounts to adjustably increase or decrease the force of the spring 72 against the ball 70.

Still referring to FIG. 4, the piston 44 has a round, generally planer body 74 made of stainless steel or the like with a cylindrical wall. A pair of parallel, semi-circular round annular mounting grooves are provided in the cylindrical wall within which are respectively mounted a pair of O-rings 76 and 78. The O-rings press against the interior surface of the cylindrical wall 22 of the brew chamber 20 to create a relatively air tight seal that prevents air located beneath the piston 44 from escaping out of the open top 29 of the brew chamber. The body 74 has a central, internally threaded mounting hole to which is threadably attached a lower end of an elongate piston drive member 80. The opposite, upper end of the drive member 80 is attached to a reciprocal drive mechanism 82. The reciprocal drive mechanism 82 functions to move the piston 44 from the position elevated above the open top 29 shown in broken-line in FIG. 4 to a preselected lower position within the interior of the cylindrical body, such as the position shown in solid line, in FIG. 4 when energized in a downward direction, and vice versa, when energized in an upward direction.

Preferably, the reciprocal drive mechanism is an electrical stepper motor or other electrical reversible motor. Alternatively, the reciprocal drive mechanism 82 is pneumatic reciprocal drive mechanism. A position sensor 83 may be used to sense the position of the piston 44 relative to the open top 29. The position indicated by the position sensor 83 is used by the controller 94, FIG. 3 to control the speed and position of the piston 44 both during the downward pressurizing movement and the upward withdrawal of the piston 44. A motor torque sensor 85 may also be used to provide, together with the position sensor 83, or independently, an indirect indication of the actual pressure of the air against the bottom of the piston 44 and thus the actual pressure against the seeping beverage layer 92. Alternatively, the actual pressure is directly measured with a pressure sensor (not shown). Alternatively, the pressure sensor 83 is employed in combination with inputs from the position sensor 83 to control the movement of the piston 44.

After the brew chamber 20 has been fully inserted into an operative brew position and sensed to be present by the brew chamber sensor 21, and a cup 18 has been sensed in the load position beneath the brew chamber 20 by cup sensor 23, the piston is in the elevated position and all other parameters, such as hot water tank level and temperature, are within appropriate limits to begin a brew cycle, then the brewer 10 is ready to respond to actuation of the start brew switch 32 to commence the brew cycle. In such case, a back light behind the start switch 32 may be lit to indicate the ready status.

When the brew start switch 32 is actuated, the first action is the rapid injection of a preselected amount of hot water 84 from a hot water tank into the open top 29 of the brew chamber 20. In the case of single phase operation, the preselected amount of hot water injected is approximately equal to the total amount of beverage to be made less whatever residual water remains in the brew chamber 20 at the end of the brew cycle. This hot water 84 is rapidly dispensed from a hot water tank outlet pipe 86 into the open top 29 of the brew chamber 20. This hot water 84 falls onto the layer of beverage ingredient 50 and mixes with the ingredient to extract the constituent flavor, aroma and other beverage components of the beverage ingredient 50 for a preselected seeping time period. In lieu of the hot water tank 96, the hot water might be provided by an instant-on heating element fed cold water by a metered pump or the like.

In any event, the seeping period and extraction begins as soon as the first hot water contacts the dry beverage ingredient layer 50, FIG. 4. A preselected time after all of the preselected amount of hot water has been added to the brew chamber 20, the reciprocal drive mechanism 82 is energized to move the drive member 80 downwardly in the direction of arrow 88 by a preselected amount and at a preselected rate, such as to the location shown in FIG. 4. Because the O-rings 76 and 78 create an air tight seal, the downward movement of the piston traps a cushion of air 90 between the beverage 92 and hot water mixture 92 above the layer of now wet beverage ingredient 50. At first, this cushion of air presses 90 presses downwardly on mixture 92 to accelerate the extraction process but not without sufficient pressure to overcome the force of the spring 72 keeping the ball valve assembly 24 closed.

After a preselected seeping time has lapsed, the piston 44 is moved further downwardly at a controlled rate to increase the pressure sufficiently to overcome the bias of the spring 72 pressing the ball 70 into a closed position, to move the ball 70 downwardly to unblock inlet 62 and open the brew chamber valve assembly 24. Almost all of the seeping beverage 92 then flows through the ingredient layer 50, through the filter paper 46, which blocks large particulates, through the perforation 58 in the filter support plate 48, through the slots 64, through the valve inlet 62, past the ball 70, through the cylindrical body 65, past the spring 72 and the outlet member 68 and out the outlet drain hole 25 into the container 18. The valve continues to move downwardly after the valve assembly 24 opens to maintain the pressure above a preselected minimum pressure needed to keep the valve assembly 24 open. The piston 44, however, is not moved downwardly at a sufficient rate to actually contact the surface of the mixed beverage 92.

Once all of the beverage 92 has drained from the brew chamber 20, the piston is automatically, quickly withdrawn upwards in a direction opposite to arrow 88 to the fully retracted standby position above the open top 29, as shown in broken-line in FIG. 4, to allow the brew chamber 20 to be removed for cleaning and another to take its place. During this retraction a check valve 89 opens to equalize pressures on either side of the piston to facilitate the upward movement. Once another clean, empty cup 18 is in place beneath the drain hole 25 and the fresh brew chamber 20 is fully installed, then another brew cycle can begin.

In a brewer 10 configured to produce an amount of beverage per brew cycle that is approximately twice the capacity of the brew chamber (such as six liters of beverage from a three liter brew chamber), the hot water dispensing period, seeping period and pressurization and draining period are performed in two successive phases, or pulses, without changing the load of beverage ingredient in the brew chamber 20. In the case of brewing two liters of beverage during one brew cycle, a brew chamber 20 is used that has a capacity to hold all the filter support plate 48, the filter paper 46, the layer of beverage ingredient 92, space for the cushion air 90, the piston 74, the elongate piston drive member 80 and plus approximately one liter of hot dispense water 84.

First, a fresh brew chamber 20 is assembled. A circular piece of filter paper 46 is mounted onto and around the mounting post 60 and on the support plate 48. A sufficient beverage ingredient 50 to make two liters of beverage 92 is then loaded on top of the filter paper 46. Next, the recharged, fresh brew chamber 20 is slidably attached to and fully engaged in operating position with the upper brewer housing section 12, as shown in FIGS. 1, 2 and 4. During this mounting process, the piston 44 is held in an elevated position to enable the brew chamber 20 to be slid into place beneath the drain hole 25. Generally, the piston is held in the elevated position except when it is moving downwardly into the brew chamber 20.

Once a suitable container 18 having a two liter capacity is installed beneath the drain hole 25 and detected by the container sensor 23, the first phase of the brew cycle may commence, if the detected water temperature and water level are in a ready condition.

When the start switch 32 is actuated, the first phase of the two phase brew cycle commences with only one liter of hot water 84 being rapidly infused into the open top 29 of brew chamber 20. The hot water 84 falls onto the initially dry layer of ingredient 50 to start mixing with the seeping ingredient 50, to start the extraction process that produces the fresh brewed beverage 92 during the first cycle seeping period.

After the end of the first cycle hot water infusion time period and approximately one liter of hot water has been added to the brew chamber, the hot water solenoid controlled dispense valve is caused to close to temporarily terminate further dispensing of hot water. The piston drive mechanism 82 is caused by the controller 94 to drive the piston 44 downwardly through the open top 29 and into the interior of the brew chamber 20 at a preselected rate and by a preselected amount, depending, in part, upon the type of beverage ingredient 50 being brewed. The layer, or cushion, of air 90 is trapped beneath the piston 44, and as the piston 44 moves downwardly, the seeping beverage 92 is selectively pressurized to accelerate the rate of absorption and extraction of the essential flavor, aroma and other components of the beverage ingredient 50.

At the end of the first phase seeping period, the piston 44 is again moved further downwardly by an amount and at a rate sufficient to cause the valve assembly 24 to open and remain open until all the beverage 92 from the first phase has been drained out of the brew chamber 20 and into the beverage container 18. After a preselected time sufficient to insure that the entire amount of beverage 92 has been drained, the piston drive mechanism 82 is again actuated to quickly move the body 74 of the piston to rise above the open top 29 and above the outlet 86 of the solenoid controlled hot water dispense valve 114, FIG. 3. This reduction of air pressure caused by the opening of the valve 89, the increase of volume and the lack of any hydraulic pressure due to the lack of beverage causes the drain valve 24 to automatically close. This ends the first phase of the brew cycle.

Importantly, during the first phase, the pressure on the remaining particulate layer of beverage ingredient 50 is limited to just enough pressure to open the valve assembly 24, but not so much as to entirely flatten and dry the particulate layer of beverage ingredient layer 50 remaining after the end of the first phase. Controlling the pressure to avoid tight compacting of the remaining ingredient layer 50 facilitates extraction of more flavors, aroma and other components from the ingredient layer 50 during the second phase of extraction. The particulates of the remaining ingredient layer 50 remain sufficiently separated from each other to facilitate aeration and percolation through thorough mixing contact with the components of the beverage ingredient during the second phase.

As soon as the first phase of the brew cycle ends, the second phase begins. During the second phase hot water dispense period, the brew chamber 20 remains in place, and another liter of hot water is rapidly injected into the brew chamber 20. After the second liter of hot water has been added, the piston 44 is again driven downwardly to pressurize the bottom portion of the brew chamber 20 to facilitate extraction but not by so much as to cause the drain valve assembly 24 to open. After the preselected second phase seeping period ends, the piston 44 is driven downwardly at a rate to further increase the pressure to a level sufficient to cause the drain valve assembly 24 to again automatically open a second time and to remain open until all of the beverage 92 brewed during the second seeping phase is discharged from the drain hole 25. The second phase beverage is added to the same container 18 to which the beverage brewed during the first phase seeping period was added. The beverages brewed during the successive phases are mixed together in the container 18 to produce a composite beverage which may be characterized as a "French style Americano" with the best attributes of drip coffee, French press coffee and espresso coffee.

After a preselected second phase drainage time period has lapsed and the entire beverage 92 has been drained out of the brew chamber 20, the piston 44 is again withdrawn to the elevated standby position, shown in broken line in FIG. 4, to enable the removal of the brew chamber 20 and to cause the drain valve assembly 24 to automatically close. Once the brew chamber 20 is removed, a refreshed brew chamber 20 may immediately take its place to start a new brew cycle.

As noted, during the first cycle, the piston 44 is not driven downwardly sufficiently for the compressed air cushion 90 to completely press and compact the remaining layer of ingredient 50 to facilitate extraction during the second phase. Specifically, the particles of the beverage ingredient layer 50 are allowed to remain sufficiently non-compacted, loose and separated from each other to facilitate percolation and mixing of the ingredient with the water during the second cycle. The non-compaction of the ingredient layer 50 is enabled in part because the press does not actually engage the ingredient layer 50 but merely increases the air pressure of the air cushion 90 by a controlled amount.

However, at the end of the second cycle drainage period, there is no need to keep the ingredient loose or still wet. During the second cycle, or last cycle, if there are more than two cycles, the final press will be sufficiently rapid and hard and the pressure sufficiently high to cause the beverage ingredient layer 50 to form into a hard, dry cake lying on top of the spent filter paper 46. This dry cake can easily be disposed by dumping the dry cake and filter out of the open top 29 of the brew chamber 20 without concern for the presence of residual water in the ingredient cake dripping on floors or into dry disposal containers or maintaining a high temperature painful to the touch. Although, the drain valve assembly 24 is closed, any valve leakage is also prevented due to the beverage ingredient layer 50 having been squeezed relatively dry.

An important advantage of the brewer 10 is that the brew chamber outlet valve 24 is normally kept closed by the spiral bias spring 72. The valve 24 is only closed when the pressure in the brew chamber is artificially kept above the minimum pressure needed to keep the valve assembly 24 open. Thus, the drain valve assembly 24 is only open when it is attached to the brewer 10 and the piston assembly 44 is actuated, thus precluding the possibility of dripping from the brew chamber 20 when removed from the brewer 10 and positioned over a floor or counter surface. Once the valve assembly 24 is automatically closed, all further draining of beverage out of the drain hole 25 ceases and any leakage through the drain valve 24 is precluded by the compacting and drying of the ingredient layer 50 before removal from the brewer 10. A drain valve assembly 24 which is serto open a five psi above atmospheric pressure has been found to work satisfactorily.

Also, when the brew chamber 20 is still attached to the brewer upper housing section 12, the cup, carafe or insulated beverage dispenser 18 may be removed from beneath the drain hole 25 without concern for drips of hot beverage falling out of the brew chamber 20 and onto the container support member 16. The need for a drip tray is thereby eliminated.

Moreover, without the automatic closure of the valve assembly 24, it is not necessary to wait with the nearly full cup or other container 18 beneath the brew chamber 20 to catch the slowly dripping, last remaining beverage soaked into the ingredient layer 90 and the filter paper 46 to prevent spillage. Thus, during this delay, the full cup 18 cannot be given to the customer and the customer must wait. In the case of larger container 18, it may not be removed to a serving location distant from the brewer 10. Likewise, the start of the new brew cycle must also wait until the end of the drip period of the brew cycle.

In accordance with present invention, the drip period can be eliminated to shorten the time duration of the brew cycle and thereby substantially improve through-put rates for performance of successive brew cycles. Moreover, in known brewers even after the end of the drip period, some dripping may continue after the cup 18 is removed which requires provision of a drip tray and the time needed to periodically empty and clean the drip tray. Similarly, after the lapse of the drip period in known dispensers, continuing dripping from the brew basket can cause hazardous drips on floors during movement of the brew basket 20 for dumping and cleaning. This time wasted and hazards caused by known brewers are avoided by the automatically drain hole closing brew chamber assembly 20.

It should be appreciated the strength and quality of the final freshly brewed beverage is affected not only by the quality and quantity of the dry beverage ingredient 50, but also by the hot water infusion time, the infusion amount during each of the phases, the hot water temperature during each of the phases, the movement profile and speed of the piston during each of the phases, the time between phases during which more hot water is added to the brew chamber, and the maximum air pressure developed in the air cushion 90. Because of the presence of multiple phases, there is an ability to selectively alter these brewing parameters during the different phases to enable a much finer level of control over the brewing process than can be obtained from a single phase brew cycle.

Referring now to FIG. 3, the brewer 10 includes a microcomputer based controller 94 which controls the brewing process in response to inputs from the program switches 36 and 38, the start switch 32, the brew chamber sensor 21 and the cup sensor 23. A hot water tank 96 has a heating element 98, level sensors connected to a level sensors interface circuit 100 and a temperature sensor connected to a temperature sensor circuit 102. When the temperature sensor senses the temperature of the hot water in the hot water tank 96 is less than a preselected level, the computer responds by signaling a hot water heater drive circuit 104 to energize an electrical heating element 106 within the hot water tank 96. When the temperature reaches a preselected maximum temperature, the heating element is de-energized to allow the water to cool. Similarly, when the level sensors circuit indicates to the computer 100 that the level of the hot water 84 is beneath a preselected maximum level, a solenoid controlled cold water inlet valve 110 is actuated to an open state to pass cold water from a cold water source 112, such as from a public water utility tap, through the valve 110 into the tank 96.

After the brewer 10 is in condition to commence a brew cycle, actuation of the start switch 32 causes the controller 94 to actuate a hot water dispense valve 114 to pass hot water 84 from the hot water tank 96 through the valve 114 and the hot water outlet 86 to the brew chamber 20. Because the level of the hot water in the hot water tank 96 is kept generally fixed, rate of flow from the hot water tank is also generally fixed, such that a preselected time period of hot water dispensing results in a corresponding preselected volume of hot water being dispensed. It should be understood that the hot water tank can be replaced by an inline, instant heating chamber that instantly heats the cold water from the cold water source 112 to a desired temperature as it passes through the instant heating chamber.

In the case of a two liter brew chamber, approximately four liters of brewed beverage may be made during two phase operation. In such case, the container 18 is preferably an insulated dispenser with a capacity of four liters. During a typical brew cycle of four liters of beverage in a four liter brew chamber, the first two liters of hot water are dispensed during the first phase in approximately sixty to one hundred twenty seconds, depending upon the type of coffee or tea ingredient being brewed. As soon as this first dispense period, or brew dilution period, ends, the first press of the first phase occurs. This first phase compression is the soft press noted above in which the layer of ingredient 50 is not completely compressed dry. The pressure of the air cushion layer rises to a maximum pressure of approximately five psi and held there for during the first phase seeping period. Again, the duration of the first phase seeping period is chosen for optimum extraction depending upon the type of coffee or tea ingredient being brewed. The piston 44 is then elevated to the position above the open top 29, and the solenoid controlled hot water dispense valve 114 is again actuated for thirty to ninety seconds to pass the second two liters of hot water into the brew chamber 20.

As soon as the second dispense period ends and the hot water dispense valve 114 is closed, the second phase press commences. The second press takes thirty to ninety seconds and the pressure at the bottom of the brew chamber is elevated to approximately five psi to open the valve assembly 24 and kept there to until the brew chamber has been completely drained and the ingredient layer compacted and dried. At the end of this second phase drain period, the piston 44 is again elevated to reduce the pressure within the brew chamber 20 to allow the brew chamber drain valve 24 to close. Once the piston assembly 44 has been elevated to the standby position above the open top 29, the brew chamber 20 may be removed without concern of residual beverage continuing to drain and drip out of the brew chamber 20.

While a particular embodiment has been disclosed in detail, it should be appreciated that many variation may be made without departing from the scope of the invention. For instance, while a hot water tank 96 and associated part have been shown for providing the hot water, as noted, the hot water tank could be substituted with an on-demand hot water device that instantly heats small amounts of water at a time immediately before providing it to the brew chamber. With such an on-demand hot water device, the temperature may be easily changed for optimum brewing from one brew cycle to the next to accommodate different ingredients. While the brew chamber drain valve 24 has been shown as a spring loaded ball valve, a resilient flapper valve or spring loaded door valve or any other pressure sensitive valve that will automatically open and close depending upon the pressure can be employed. While the preferred embodiment has employed movement of an airtight piston to achieve the control pressures within the brew chamber, the same pressures can, of course, also be obtained by means of a remote pressure source, such as a pressure pump, that is fed into the brew chamber while the top is sealed by a relatively fixed pressure-tight top closure. While the brewing of four liters has been described as being performed in two phases, multiple phases can be avoided by employing a four liter capacity brew chamber. Likewise, if desired to make more than four liters of beverage in a two liter brew chamber, the process may extended to three or more phases. Other variations will occur to those of ordinary skill in the art of beverage brewer design.

The invention claimed is:

1. A method of brewing a beverage comprising the steps of:
    (a) loading the brewer with a brew chamber with a controllable drain valve and containing the preselected single quantity of dry beverage ingredient;
    (b) injecting a first preselected quantity of hot water into the brew chamber and onto the dry beverage ingredient to mix with the beverage ingredient for a first preselected seeping period;
    (c) automatically opening the brew chamber controllable drain valve at the end of the first preselected seeping period;
    (d) automatically controlling the air pressure in the brew chamber to control the rate of draining of beverage from the controllable drain valve;
    (e) draining a preselected amount of beverage from the brew chamber;
    (f) automatically closing the brew chamber drain valve at the end of the first preselected seeping period;
    (g) injecting a second preselected quantity of hot water into the brew chamber to mix with the beverage, ingredient for a second preselected seeping period;
    (h) automatically opening the brew chamber controllable drain valve at the end of the second preselected seeping period;
    (i) automatically controlling the air pressure in the brew chamber at the end of the preselected seeping period to control the rate of draining of beverage from the controllable drain valve; and
    (10) automatically draining beverage from the brew chamber at the end of the second seeping period.

2. The brewing method of claim 1 including the step of mixing the beverage drained during the second seeping period with the beverage drained during first seeping period to produce a composite beverage.

3. The brewing method of claim 1 includes the step of controlling the pressure by controlling the movement of the air-tight piston in a cylindrical portion of a brew chamber above a dry ingredient support located above a drain hole and drain valve.

4. The brewing, method of claim 1 in which the brew chamber drain valve is a pressure sensitive valve and including the step of varying the air pressure in the brew chamber above the beverage within the brew chamber to control the brew chamber drain valve.

5. The beverage brewing method of claim 1 in which substantially all the beverage is drained from the brew chamber at the end of the first seeping period before the second preselected quantity of water is injected into the open top of the brew chamber.

6. The beverage brewing method of claim 5 including the steps of elevating the piston above the open top of the brew chamber after all the beverage has been drained to enable sliding removal of the brew chamber from the brewer,
installing a fresh brew chamber, and
injecting water into the open top.

7. The method of claim 1 including the step of blocking inadvertent and dangerous removal of the brew chamber with the piston when the piston is within the brew chamber.

8. A method of brewing beverage in an automatic, electric brewer, comprising the steps of:
   (a) seeping only in a brew chanter a first preselected quantity of hot water with a preselected quantity of beverage ingredient for a preselected first seeping time period;
   (b) draining the beverage from the brew chamber at the end of the preselected first seeping time period into a beverage container;
   (c) maintaining the beverage ingredient remaining in the brew chamber after the end of the first preselected seeping time period;
   (d) injecting a second preselected quantity of hot water into the brew chamber to mix with the beverage ingredient remaining in the brew chamber after the end of the first seeping period;
   (e) seeping in the brew chamber the second quantity of hot water with beverage ingredient remaining for a second preselected seeping time period; and
   (f) draining the beverage from the brew chamber into the beverage container to mix with the beverage drained into the container at the end of the first seeping period.

9. A method of brewing a beverage in an automatic, electric brewer, comprising the steps of:
   (a) seeping a preselected quantity of beverage ingredient in a preselected quantity of hot water in a brew chamber for a preselected seeping period to form a beverage:
   (b) opening a brew chamber drain valve at the end of the preselected, seeping period to allow the beverage to drain from the brew chamber; and
   (c) pressing an air-tight piston downwardly into the brew chamber above the beverage to increase the air pressure above the beverage to control the rate of draining of the beverage from the brew chamber.

10. The brewing method of claim 9 including, the step of pressing downwardly only on a cushion of air trapped between the piston and the top of the beverage when the piston is inserted into the top of the brew chamber and does not contact the beverage.

11. The brewing method of claim 9 in which
    the chamber drain valve is a pressure sensitive valve, and
    the step of opening the brew chamber drain valve includes
       the step of pressing the air-tight piston downwardly to increase a total of hydraulic pressure and air pressure on the valve sufficiently to open the valve, said step of opening being performed automatically in an electrical brewer.

12. A method of brewing a beverage in an automatic, electrical brewer, comprising the steps of:
    (a) seeping a preselected, quantity of beverage ingredient in a preselected quantity of hot water in a brew chamber for a preselected seeping period to form a beverage;
    (b) increasing the air pressure of a pocket of air in the brew chamber above a preselected minimum opening pressure; and
    (c) automatically, mechanically opening a brew chamber pressure sensitive drain valve with force from both the hydraulic pressure of the hot water within the brew chamber and the air pressure of the pocket of air when a total of the hydraulic pressure and the air pressure in the brew chamber exceeds the preselected minimum opening pressure to open the pressure sensitive drain valve to drain the beverage from the brew chamber.

13. The beverage brewing method of claim 12 in which the pressure sensitive valve is a ball valve with a movable ball that is automatically moved to a closed position by a bias spring when the total pressure on the valve is less than the preselected minimum opening pressure.

14. The beverage brewing, method of claim 12 including the steps of
    automatically closing the valve at the seeping period in response to a decrease in pressure, and
    removing the brew chamber away from the brewer to clean the brew chamber after the valve has been automatically closed to prevent residual beverage in the brew chamber leaking or dripping out of the brew chamber.

15. The beverage brewing method of claim 14 including the step of controlling the air pressure by controlling movement of a piston having an air-tight seal with an interior surface of the brew chamber above the beverage.

16. The beverage brewing method of claim 15 including the steps moving the piston downwardly to press against a cushion of trapped air that, in turn, presses downwardly on the surface of the beverage at the bottom of the brew chamber.

17. The beverage brewing method of claim 15 including the step of moving the piston upwardly to decrease the pressure to opening a pressure release valve in the surface of the piston to facilitate easy upward movement of the piston when the piston is move upwardly to decrease the pressure.

18. The brewing, method of claim 15 including the steps of elevating the piston entirely out of the open top of the brew chamber to enable removal of the brew chamber from the brewer after the end of the seeping period.

* * * * *